United States Patent [19]

Grable

[11] Patent Number: 5,791,613
[45] Date of Patent: Aug. 11, 1998

[54] UNIVERSAL MOUNTING BRACKET FOR DOWNRIGGERS

[76] Inventor: Dennis Grable, 1602 Brookside Dr., Apt. 111, St. Joseph, Mo. 64505

[21] Appl. No.: 813,191

[22] Filed: Mar. 10, 1997

[51] Int. Cl.⁶ ............................................. A01K 97/10
[52] U.S. Cl. ................ 248/200.1; 248/231.21; 43/21.2
[58] Field of Search ................ 43/21.2, 27.4; 248/200.1, 231.21

[56] References Cited

U.S. PATENT DOCUMENTS

| | | | |
|---|---|---|---|
| 2,815,517 | 12/1957 | Andersen, Jr. | 114/363 |
| 3,795,927 | 3/1974 | Darwin, Jr. et al. | 114/363 |
| 4,248,002 | 2/1981 | McNellis | 43/27.4 |
| 4,388,774 | 6/1983 | Thoemke | 43/21.2 |
| 4,438,582 | 3/1984 | Lummis | 43/27.4 |
| 4,617,752 | 10/1986 | Seres | 43/27.4 |
| 4,766,838 | 8/1988 | Johnson | 114/363 |
| 4,773,709 | 9/1988 | Slinkard | 114/363 |
| 4,823,723 | 4/1989 | Brooks | 43/21.2 |
| 4,869,195 | 9/1989 | Eichfeld | 43/21.2 |
| 4,901,469 | 2/1990 | Murray | 43/21.2 |
| 4,947,777 | 8/1990 | Yoder | 43/27.4 |
| 5,673,507 | 10/1997 | Stokes, Jr. | 43/21.2 |

*Primary Examiner*—Daniel D. Wasil
*Attorney, Agent, or Firm*—Hovey, Williams, Timmons & Collins

[57] ABSTRACT

An easily assembled universal mounting bracket (10) provides mounting surfaces (36) for mounting downriggers (14). The mounting bracket (10) preferably includes two sidewall-engaging elements (16) and connection structure (18) which serves to grippingly secure mounting bracket (10) within a boat (12) without the necessity of attaching nuts and bolts or the like to boat (12). Downrigger (14) is mounted on support surface (36). Legs (50) are slidably pressed against sidewalls (80) and secured in gripping engagement when screw clamps (56) are tightened through frame (48) onto legs (50). In preferred embodiments, legs (50) include foot members (70) which are slidably received within track structure (28).

9 Claims, 2 Drawing Sheets

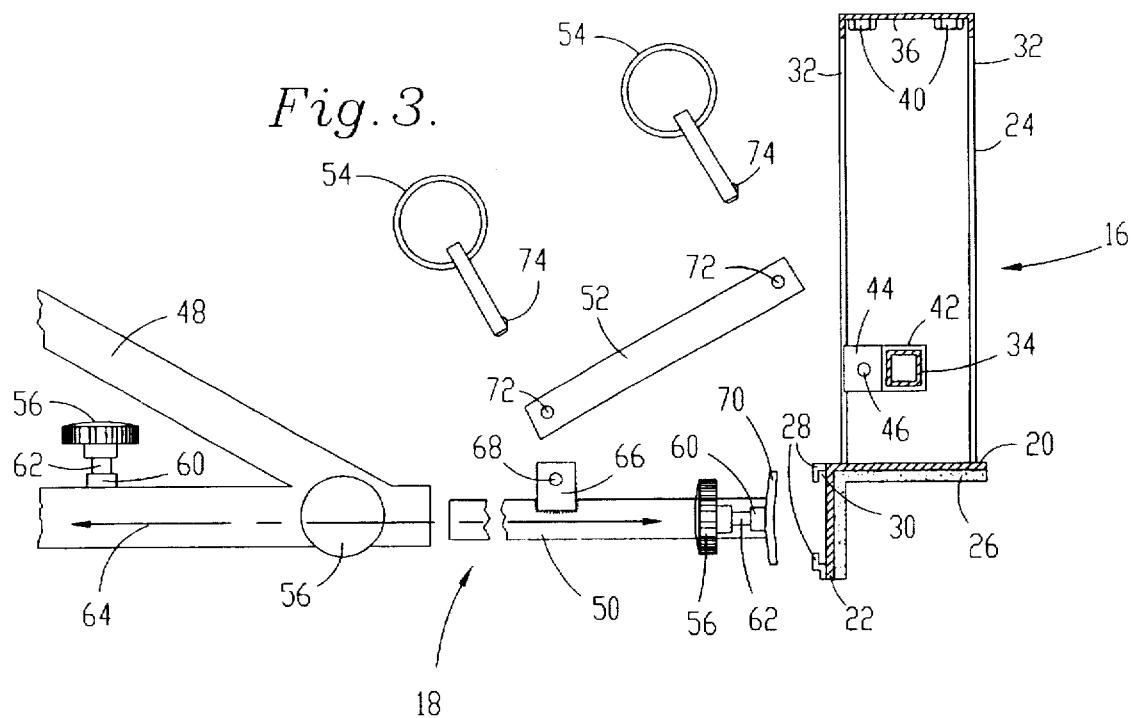
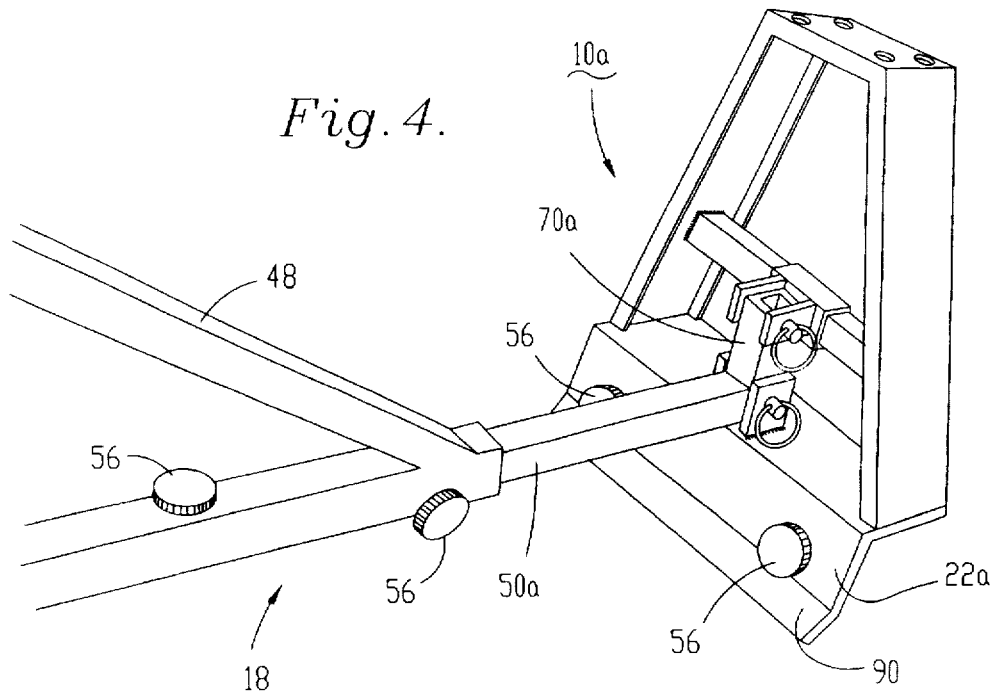

UNIVERSAL MOUNTING BRACKET FOR DOWNRIGGERS

BACKGROUND OF THE INVENTION

1. Field of the Invention

This invention relates to a universal mounting bracket designed to provide a convenient mounting site in a boat for fishing apparatus and the like. More particularly, it is concerned with a mounting bracket having two sidewall-engaging elements for mounting downriggers, the elements resting on opposing gunnels, and connecting structure for placing the elements in compression against upper portions of the respective sidewalls.

2. Description of the Prior Art

In the last several years, downriggers have become quite popular among both fresh water and ocean fishermen. Downriggers provide a reel for feeding out steel cable attached to fishing line so that the fishing lure or bait can be submerged in the water to a predetermined depth. Mounting a downrigger on a fishing boat is not an insignificant problem due to the weight and bulk of the apparatus. Some boats now come equipped with mounting plates affixed to the gunnels for that very purpose. If no such plate is provided however, downriggers and the like have simply been bolted into the gunnels with hardware.

One problem with such bolting is the resulting wear and tear to the gunnels of the boat. This is especially true for fiberglass boats but is also a problem for wooden and metal gunnels as well. Additionally, such mounting systems serve as an aesthetic blight and are often time consuming to install. What is needed is a system which provides a secure mounting surface for downrigger apparatus and the like, does not require the attachment of hardware to the gunnels, and yet is easy to detach from the boat itself.

A number of systems have been used for providing mounting structure in boats in general, however these units have not met the above-described needs because of the requirement of hardware. Patents illustrating these prior units include: U.S. Pat. Nos. 2,815,517, 4,248,002, 4,388, 774, 4,438,582, 4,617,752 and 4,766,838.

SUMMARY OF THE INVENTION

The problems outlined above are in large measure solved by the universal mounting bracket in accordance with the present invention. That is to say, the mounting bracket hereof is attached to the boat by gripping compression rather than hardware, provides a secure surface for mounting a downrigger or the like, and is easily assembled and mismantled.

The mounting bracket in accordance with the present invention broadly includes a pair of sidewall-engaging elements, at least one of which includes an upstanding mount for supporting a downrigger. The elements are securely fixed on the gunnels of a boat by connection structure which includes a pair of elongated legs, each respectively secured to a corresponding element, and a frame coupling the legs between the sidewalls in a manner so as to exert outwardly extending clamping forces through the legs to the elements.

In preferred forms the elements include respective flanges for engaging upper portions of the respective sidewalls. In particularly preferred forms, each of the legs includes an elongated, rectangular foot member at the end distal to the frame, the foot member being transverse to the leg, with each of the flanges including track structure presenting an elongated, rectangular track, also transverse to the leg. Each of the track structures snugly receives a corresponding foot member within the track.

BRIEF DESCRIPTION OF THE DRAWING

FIG. 3 is an exploded, partially sectional view of the same end of the mounting bracket; and FIG. 4 is a perspective view of an alternative embodiment of the present invention.

DESCRIPTION OF THE PREFERRED EMBODIMENT

Figure 1:
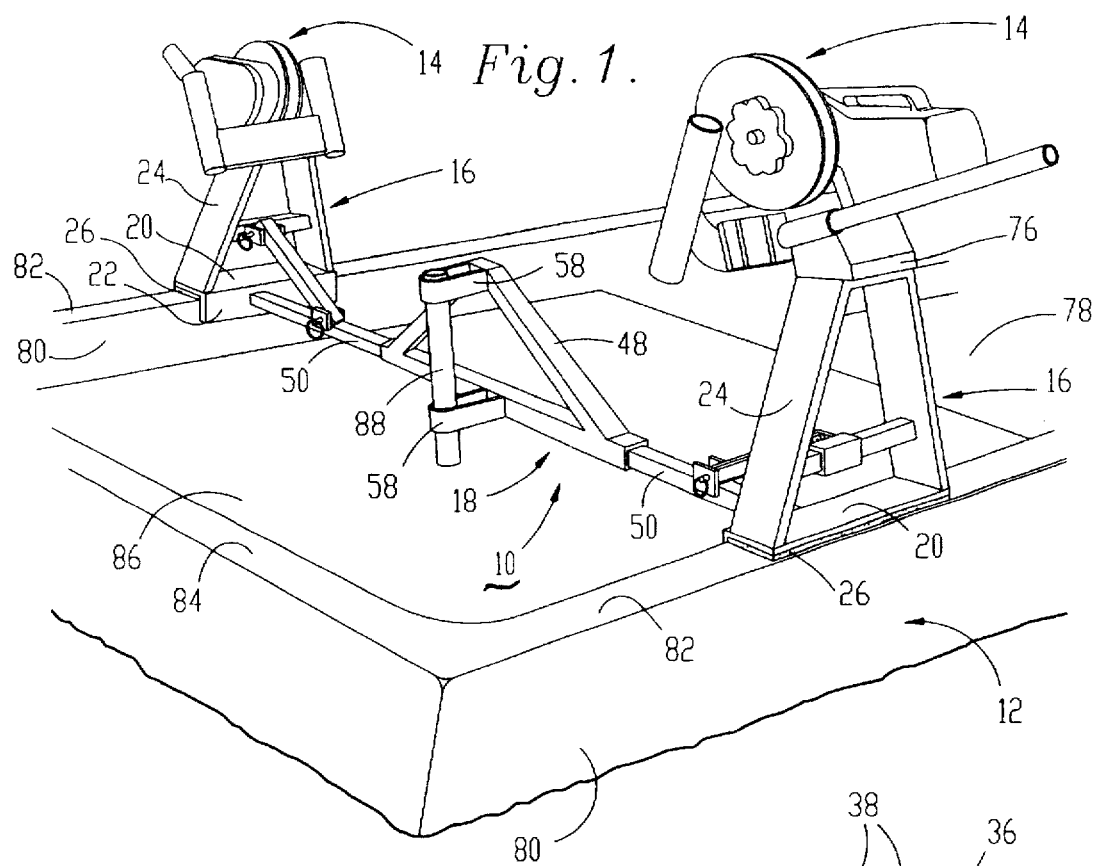
FIG. 1 is a perspective view of the preferred universal mounting bracket in accordance with the present invention, mounted between the sidewalls of a boat with downriggers mounted on either end of the mounting bracket.

Referring now to the drawings in general and FIG. 1 in particular, a universal mounting bracket for downriggers 10 is shown mounted in a boat 12. A downrigger 14 is mounted on either end of mounting bracket 10 but it will be understood that other apparatus could also be mounted thereon. The universal mounting bracket 10 in accordance with the invention broadly includes sidewall-engaging elements 16 and connection structure 18.

Each element 16 includes base 20, flange 22, upwardly extending mount 24 and cushion 26. Elements 16 may be constructed of any rigid, durable material such as steel.

Figure 2:
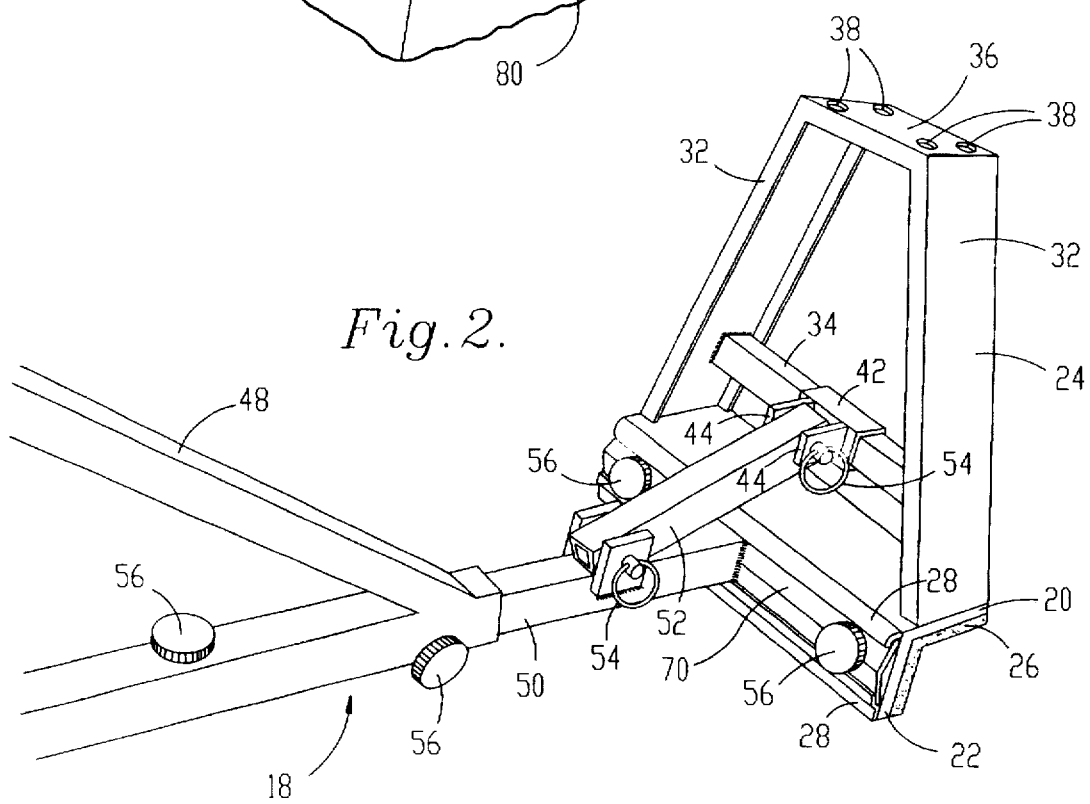
FIG. 2 is a perspective view of one end of the mounting bracket.

Referring to FIGS. 2 and 3 it will be seen that base 20 and flange 22 are integrally formed, with cushion 26 adhesively fixed to these components as shown. Cushion 26 is preferably made of rubber or a synthetic resin material with sufficient resilience to perform the functions described below. Track structure 28 presents an elongated rectangular track 30 for purposes described hereinbelow.

Mount 24 includes mount walls 32, crosspiece 34 and support surface 36 having four threaded bores 38 with four corresponding welded nuts 40 therebelow (only two of which are visible in FIG. 3). Mount 24 further includes slidable collar 42 having two tabs 44 affixed thereon. Each tab 44 has a corresponding, centrally disposed aperture 46. In order to assemble mount 24, collar 42 must first be slidably engaged on crosspiece 34 which is then welded or otherwise firmly secured on the insides of respective mount walls 32.

Still referring to FIGS. 2 and 3, connection structure 18 is also constructed out of steel or some other rigid durable material except as otherwise noted and includes hollow, triangularly shaped frame 48, legs 50, support bar 52, four pins 54 and eight screw cramps 56. Frame 48 includes two straps securely fixed thereon (see FIG. 1). Straps 58 may be of any reasonably flexible, strong material, such as a synthetic resin or leather. Frame 48 also includes four threaded bores 60 which protrude slightly from frame 48 (see FIG. 3). Each bore 60 corresponds with a screw clamp 56. Only two of the screw clamps 56 are visible in FIGS. 2 and 3 but it will be readily appreciated that the other two screw clamps 56 and bores 60 are symmetrically disposed on the other end of frame 48. Shaft 62 of clamp 56 is long enough to enter bore 60 and penetrate into the hollow interior portions of frame 48.

Frame 48 is also referred to generally as a leg coupling device, in that it provides structure for coupling the two legs together so as to provide compressional forces to be discussed below. Any structure which slidably, securely couples legs 50 can be substituted for frame 48.

Elongated, hollow, rectangular in cross section legs 50 present a compression axis 64. Legs 50 are slidably received in either end of frame 48 which defines a channel therein for slidable adjustment of the legs 50. Each leg 50 has two tabs 66 and corresponding apertures 68 analogous to tabs 44 and aperture 46 of collar 42. Each leg 50 also has an elongated, rectangular foot member 70, integrally formed on the end of the leg 50 and distal from the frame 48. Foot member 70 is transversely oriented with respect to compression axis 64 and includes two bores 60 and screw cramps 56 in a fashion strictly analogous to frame 48.

Support bar 52 secures a leg 50 to a corresponding mount 24 as shown in FIG. 2. Support bar 52 includes support bar apertures 72 as shown in FIG. 3. One pin 54 is received through aperture 46, support bar aperture 72 and aperture 46 on the opposite side to secure the top of support bar 52 to mount 24, while the other pin 54 is received through aperture 68, support bar aperture 72 and the opposite aperture 68 to secure the bottom portion of support bar 52 to leg 50. The pins 54 remain secure because of spring loaded detents 74 (see FIG. 3).

Downrigger 14 has a substantially planar downrigger base 76 adapted for being bolted to support surface 36 by means of threaded bores 38 and welded nuts 40. Downrigger 14 is an apparatus for reeling out a determined amount of steel cable attached to a fishing line so as to fish at a selected depth. It will be readily appreciated by those skilled in the art that other types of apparatus other than a downrigger may also be mounted on support surface 36; further, the universal mounting bracket 10 could be designed so that only one element 16 had such a support surface 36, but of course in the preferred embodiment two support surfaces 36 are provided.

Boat 12 has a hull 78, sidewalls 80, gunnels 82, a transom 84 suitable for mounting an outboard motor or the like, an elevated surface 86 and a pedestal 88 mounted thereon. Universal mounting bracket 10 may be positioned relative to pedestal 88 as shown in FIG. 1 so that straps 58 are maximally extended or, in order to give greater support to the mounting bracket 10, the mounting bracket 10 may be positioned closer to pedestal 88 with straps 58 cinched tighter. Lugs may be attached to frame 48 with VELCRO surfaces on straps 58 for such cinching capabilities, as will be readily appreciated by those skilled in the art. Shorter straps than those depicted in FIG. 1 can also be used. A seat (not shown) is mounted on top of pedestal 88 once the universal mounting bracket 10 has been installed so that when the fishermen sits in the seat his weight serves to additionally support the mounting bracket 10.

Referring to FIG. 4, another embodiment of the present invention is shown. Mounting bracket 10a is very similar to the preferred embodiment except that the compression axis 64 is above flange 22a and no track structure is provided. It will also be noted that the lowermost portion of flange 22a includes a flange element 90 downwardly depending at an angle oblique to a vertical plane. The purpose of flange element 90 is to abut a sidewall having a significant slope at the top. It will also be noted that leg 50a includes a foot member 70a which is structured to obviate the necessity of a support bar. Screw clamps 56 penetrate through flange 22a and may be connected on the outboard side of a sidewall in conjunction with appropriate hardware. This design is a useful adaptation for a thinner, sloped sidewall with a different type of gunnel than pictured in FIG. 1. For example, a ring-like hollow gunnel would be typical of the kind of structure suitable for universal mounting bracket 10a.

In operation, a downrigger 14 is mounted to universal mounting bracket 10 as depicted in FIG. 1 for the purpose of placing a fishing line at a predetermined depth in the water for enhanced fishing results. Before such operation, universal mounting bracket 10 must be assembled as follows.

Legs 50 are inserted into the channel of frame 48 and then straps 58 are secured to pedestal 88. As noted above, the straps are either shorter than as depicted in FIG. 1 or are cinched up so that the pedestal is placed in a position as close to the frame 48 as possible thus providing additional support to the mounting bracket. The straps 58 are illustrated in FIG. 1 as having greater length primarily for ease of illustration.

Each foot member 70 is placed in a corresponding track 30 with the clamping screws 56 tightened against flange 22. One of the elements 16 is then seated on the appropriate gunnel 82 so as to engage flange 22 with upper portions of sidewall 80. The two screw caps 56 associated with the end of frame 48 closest to to that sidewall 80 are then tightened to securely fix the associated leg 50 and element 16 with respect to frame 48. Support bar 52 on that side is also mounted so as to completely secure the one side of boat 12. It should be noted in this regard that cushion 26 serves to directly contact gunnel 82 and upper portions of sidewall 80 in such a way that wear and tear is minimized on the boat while also frictionly maximizing the firmness of the grip mounting bracket 10 exerts on sidewall 80 and gunnel 82.

If any appurtenant structure of the sidewall 80 or gunnel 82, (e.g., a railing or the like), interferes with placement of element 16, the following procedure can be used. Screw clamps 56 in foot member 70 and frame 48 are loosened and element 16 is then shifted along gunnel 82 with the track structure riding along foot member 70 in monorail fashion. Once the desired position along gunnel 82 is reached, screw clamps 56 are tightened to engage flange 22 and leg 50 once again. If the relative shifting is great enough, it will be appreciated that only one of screw clamps 56 will engage flange 22. Support bar 52 need not be removed during this shifting because collar 42 can also slide along crosspiece 34.

The same procedure is repeated at the other sidewall except this time the process includes a penultimate step before clamping the two screw cramps 56 through frame 48 into leg 50. This step is to maximize the forces exerted by flange 22 against sidewall 80. Essentially, the user manually exerts leg 50 outwardly against sidewall 80 with sufficient force that mounting bracket 10 will remain secure. Finally then, the clamps screws 56 are tightened against leg 50 on the second side without, of course, releasing the force exerted through leg 50 before screw clamps 56 have securely frictionally engaged leg 50. At least one downrigger 14 is then mounted on either support surface 36 or, preferably, downriggers 14 are mounted on each support surface 36 for optimum fishing. The seat is then placed on pedestal 38 and the system is then fully operational.

Should the user decide to remove downriggers 14 subsequently he can do so without having to dismantle mounting bracket 10. Alternatively however, he may also, after removing downriggers 14, dismantle mounting bracket 10 in the reverse order of that described above. It will be noted that the mounting bracket 10a of FIG. 4 will optionally allow the use of screw clamps 56 penetrating through the sidewalls and fixed thereon, in which case the dismantling of mounting bracket 10a would require additional steps.

I claim:

1. A universal mounting bracket for securely mounting at least one apparatus on a boat having a hull presenting two spaced sidewalls with gunnels, a floor-like elevated surface substantially parallel with the hull and a seat pedestal upwardly extending from the elevated surface, said mounting bracket comprising:

a pair of sidewall-engaging elements, at least one of said elements including an upstanding mount for supporting fishing apparatus; and connection means for placing said elements in compression against the respective sidewalls in order to releasably secure said mounting bracket in place within the boat without the need for permanent connection thereof to the boat, said connection means including a pair of elongated legs respectively secured to a corresponding element and extending inwardly therefrom, and means coupling said legs between the sidewalls for exerting outwardly extending clamping forces through said legs to said elements.

2. The universal mounting bracket of claim 1, wherein said connection means includes a support bar, securing a leg to a corresponding mount.

3. The universal mounting bracket of claim 1, wherein said connection means further includes strap means operably coupled with said leg coupling means for securing said leg coupling means to the pedestal so that said mounting bracket is provided additional support.

4. The universal mounting bracket of claim 1, wherein the apparatus to be mounted is a downrigger fishing unit with a substantially planar base adapted for being bolted to a support surface, and wherein said upstanding mount includes respective uppermost portions which are substantially planar and suitable for releasably securing the downrigger base thereon.

5. The universal mounting bracket of claim 1, wherein said elements include cushion means respectively affixed adjacent lower portions thereof so as to contact the corresponding sidewall and gunnel, for minimizing wear on the sidewalls and gunnels and maximizing the grip exerted by said mounting bracket thereon.

6. The universal mounting bracket of claim 1, said elongated legs presenting a compressional axis, said mounts including respective depending flanges abutting upper portions of the sidewalls, said flanges being substantially orthogonal to said axis.

7. The universal mounting bracket of claim 6, wherein said axis is located above said flanges.

8. The universal mounting bracket of claim 6, wherein said axis passes through said flanges.

9. The universal mounting bracket of claim 6, each of said legs including an elongated, rectangular foot member integrally formed on the end of said leg distal from said leg coupling means, and each of said flanges including track structure presenting an elongated, rectangular track transverse to said compressional axis, each of said track structures snugly, releasably receiving a corresponding foot member in said track.

* * * * *